US012416058B2

(12) United States Patent
Machado Amorim et al.

(10) Patent No.: US 12,416,058 B2
(45) Date of Patent: *Sep. 16, 2025

(54) HOT FORMED PRE-COATED STEEL PART

(71) Applicant: ArcelorMittal, Luxembourg (LU)

(72) Inventors: Tiago Machado Amorim, Longeville les Metz (FR); Christian Allely, Metz (FR); Raisa Grigorieva, Metz (FR); David Dussaussois, Homecourt (FR)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,128

(22) Filed: Aug. 31, 2021

(65) Prior Publication Data

US 2021/0395853 A1 Dec. 23, 2021

Related U.S. Application Data

(63) Continuation of application No. 15/748,395, filed as application No. PCT/IB2016/000983 on Jul. 11, 2016, now Pat. No. 11,162,153.

(30) Foreign Application Priority Data

Jul. 30, 2015 (WO) .................. PCT/IB2015/001284

(51) Int. Cl.
| | | |
|---|---|---|
| *C21D 9/46* | (2006.01) | |
| *B21D 22/02* | (2006.01) | |
| *B32B 15/01* | (2006.01) | |
| *C21D 1/673* | (2006.01) | |
| *C21D 6/00* | (2006.01) | |
| *C21D 8/00* | (2006.01) | |
| *C22C 21/02* | (2006.01) | |
| *C22C 21/10* | (2006.01) | |
| *C23C 2/12* | (2006.01) | |
| *C23C 2/26* | (2006.01) | |
| *C23C 2/28* | (2006.01) | |
| *C23C 2/40* | (2006.01) | |

(52) U.S. Cl.
CPC ............. *C21D 9/46* (2013.01); *B21D 22/022* (2013.01); *B32B 15/012* (2013.01); *C21D 1/673* (2013.01); *C21D 6/004* (2013.01); *C21D 6/005* (2013.01); *C21D 6/008* (2013.01); *C21D 8/005* (2013.01); *C22C 21/02* (2013.01); *C22C 21/10* (2013.01); *C23C 2/12* (2013.01); *C23C 2/26* (2013.01); *C23C 2/261* (2022.08); *C23C 2/28* (2013.01); *C23C 2/29* (2022.08); *C23C 2/40* (2013.01); *C21D 2211/002* (2013.01); *C21D 2211/005* (2013.01); *C21D 2211/008* (2013.01)

(58) Field of Classification Search
CPC .... B21D 22/022; B32B 15/012; C21D 1/673; C21D 2211/002; C21D 2211/005; C21D 2211/008; C21D 6/004; C21D 6/005; C21D 6/008; C21D 8/005; C21D 9/46; C22C 21/02; C22C 21/10; C23C 2/12; C23C 2/26; C23C 2/28

See application file for complete search history.

(56) References Cited

U.S. PATENT DOCUMENTS

| | | |
|---|---|---|
| 6,635,359 B1 | 10/2003 | Kurosaki et al. |
| 7,867,344 B2 | 1/2011 | Kusumi et al. |
| 8,453,482 B2 | 6/2013 | Maki et al. |
| 8,858,735 B2 | 10/2014 | Kondo et al. |
| 9,034,480 B2 | 5/2015 | Yoshida et al. |
| 9,074,277 B2 | 7/2015 | Maki et al. |
| 9,234,267 B2 | 1/2016 | Yoshida et al. |
| 9,296,520 B2 | 3/2016 | Watakabi |
| 11,162,153 B2 | 11/2021 | Machado Amorim et al. |
| 2005/0142294 A1 | 6/2005 | Marutian et al. |
| 2007/0163685 A1 | 7/2007 | Steel |
| 2007/0271978 A1 | 11/2007 | Brandstatter et al. |
| 2010/0068412 A1 | 3/2010 | Chaleix |
| 2010/0221572 A1 | 9/2010 | Laurent et al. |
| 2010/0282373 A1 | 11/2010 | Van Tol et al. |
| 2010/0319426 A1 | 12/2010 | Pohl et al. |
| 2011/0274945 A1 | 11/2011 | Corp |
| 2011/0303328 A1 | 12/2011 | Kondo et al. |
| 2012/0073351 A1 | 3/2012 | Maki et al. |
| 2012/0085466 A1 | 4/2012 | Lupp et al. |
| 2012/0085467 A1* | 4/2012 | Thirion .................. C22C 38/04 148/531 |

(Continued)

FOREIGN PATENT DOCUMENTS

| | | |
|---|---|---|
| CN | 1829816 | 9/2006 |
| CN | 101617059 A | 12/2009 |

(Continued)

OTHER PUBLICATIONS

Hauger A et al., "Flexibles Walzen Von Tailer Rolled Blanks// Flexible Rolling of Tailor Rolled Blanks", Stahl und Eisen, Verlag Stahleisen, Jan. 1, 2006, pp. 21-23, vol. 126, No. 5, Dusseldorf, DE See English Abstract.

(Continued)

Primary Examiner — Jenny R Wu
(74) Attorney, Agent, or Firm — Davidson Kappel LLC

(57) ABSTRACT

A hot formed pre-coated steel part includes a steel sheet precoated with a metallic coating and hot formed, the coating including: 2.0 to 24.0% by weight of zinc; 1.1 to 7.0% by weight of silicon; optionally from 0.5 to 3.0% by weight of magnesium when the amount of silicon is between 1.1 and 4.0%, and optionally additional elements chosen from Pb, Ni, Zr or Hf, a content by weight of each additional element being less than 0.3% by weight, a balance being aluminum, unavoidable impurities and residual elements resulting from feeding ingots or from a passage of the steel sheet in a molten bath; and a ratio Al/Zn by weight greater than 2.9, where a microstructure in the steel after said hot forming being martensitic or martensitic-bainitic or made of at least 75% of equiaxed ferrite, 5 to 20% of martensite and bainite in an amount less than or equal to 10%.

57 Claims, 1 Drawing Sheet

(56) References Cited

U.S. PATENT DOCUMENTS

| | | | |
|---|---|---|---|
| 2012/0088115 A1* | 4/2012 | Smith | C23C 2/12 |
| | | | 428/548 |
| 2012/0135263 A1 | 5/2012 | Kobayashi et al. | |
| 2012/0186705 A1* | 7/2012 | Sikora | B21D 37/16 |
| | | | 148/714 |
| 2012/0267012 A1 | 10/2012 | Sohn et al. | |
| 2013/0206824 A1 | 8/2013 | Wakatabi | |
| 2013/0236739 A1 | 9/2013 | Yoshida et al. | |
| 2013/0295411 A1* | 11/2013 | Yoshida | C23C 28/322 |
| | | | 428/659 |
| 2014/0027026 A1 | 1/2014 | Schwinghammer et al. | |
| 2014/0216612 A1* | 8/2014 | Laurent | C23C 2/26 |
| | | | 148/531 |
| 2014/0377584 A1 | 12/2014 | Hasegawa et al. | |
| 2015/0007911 A1* | 1/2015 | Murakami | C22C 38/32 |
| | | | 148/507 |
| 2015/0020562 A1 | 1/2015 | Yamanaka et al. | |
| 2015/0147589 A1 | 5/2015 | Bouaziz et al. | |
| 2015/0191813 A1 | 7/2015 | Maki et al. | |
| 2015/0284861 A1 | 10/2015 | Allely et al. | |
| 2016/0222484 A1 | 8/2016 | Koyer et al. | |
| 2017/0073792 A1 | 3/2017 | Hikida et al. | |
| 2018/0023177 A1 | 1/2018 | Rachiele et al. | |
| 2018/0044774 A1 | 2/2018 | Allely et al. | |
| 2018/0051366 A1* | 2/2018 | Ooi | C23C 2/28 |
| 2018/0195159 A1 | 7/2018 | Sohn et al. | |
| 2018/0216218 A1 | 8/2018 | Machado Amorim et al. | |
| 2018/0223386 A1 | 8/2018 | Machado Amorim et al. | |
| 2018/0223409 A1 | 8/2018 | Allely et al. | |
| 2019/0044774 A1 | 2/2019 | Crols | |
| 2019/0218651 A1 | 7/2019 | Allely et al. | |
| 2019/0271342 A1 | 9/2019 | Canourgues et al. | |

FOREIGN PATENT DOCUMENTS

| | | | | |
|---|---|---|---|---|
| CN | 101631880 | | 1/2010 | |
| CN | 102011082 A | | 4/2011 | |
| CN | 102300707 | | 12/2011 | |
| CN | 102301014 | | 12/2011 | |
| CN | 102791901 B | | 11/2012 | |
| CN | 103547687 | | 1/2014 | |
| CN | 104388870 A | | 3/2015 | |
| CN | 2553128 | | 6/2015 | |
| DE | 10246164 A1 * | | 4/2004 | C21D 1/673 |
| DE | 202012000616 U1 | | 2/2012 | |
| EP | 1134301 A1 | | 9/2001 | |
| EP | 1225246 | | 5/2011 | |
| EP | 2644736 A1 | | 10/2013 | |
| EP | 2695963 A1 | | 2/2014 | |
| EP | 2839049 B1 | | 10/2017 | |
| JP | S464045 Y1 | | 2/1971 | |
| JP | S60162763 A | | 8/1985 | |
| JP | H04293759 A | | 10/1992 | |
| JP | H10176238 | | 6/1998 | |
| JP | 11279735 A * | | 10/1999 | |
| JP | H11279735 A | | 10/1999 | |
| JP | 2000104153 A | | 4/2000 | |
| JP | 2000328216 A | | 11/2000 | |
| JP | 2001073108 A | | 3/2001 | |
| JP | 2001115247 A | | 4/2001 | |
| JP | 2001214280 A | | 8/2001 | |
| JP | 2002012959 A | | 1/2002 | |
| JP | 2002322527 A | | 11/2002 | |
| JP | 2003251272 A | | 9/2003 | |
| JP | 2004339530 A | | 12/2004 | |
| JP | 2005060728 A | | 3/2005 | |
| JP | 2005290418 A | | 10/2005 | |
| JP | 2006051543 A | | 2/2006 | |
| JP | 2006193776 A | | 7/2006 | |
| JP | 2006218518 A * | | 8/2006 | |
| JP | 2006299377 A | | 11/2006 | |
| JP | 2007182608 | | 7/2007 | |
| JP | 2007211276 A | | 8/2007 | |
| JP | 2008038168 A * | | 2/2008 | |
| JP | 2008111189 A | | 5/2008 | |
| JP | 2010070784 | | 4/2010 | |
| JP | 2010515830 A | | 5/2010 | |
| JP | 2010229483 A * | | 10/2010 | |
| JP | 2010535636 | | 11/2010 | |
| JP | 4733522 B2 | | 7/2011 | |
| JP | 2011152589 A | | 8/2011 | |
| JP | 2012112010 A | | 6/2012 | |
| JP | 2012516939 A | | 7/2012 | |
| JP | 2015094006 A | | 5/2015 | |
| JP | 2016539249 A | | 12/2016 | |
| KR | 0146986 B1 | | 11/1998 | |
| KR | 100317680 A1 | | 12/2001 | |
| KR | 20040007718 A | | 1/2004 | |
| KR | 20140119809 A * | | 10/2014 | |
| RU | 2403309 | | 11/2010 | |
| RU | 2466210 | | 11/2012 | |
| RU | 2544977 C2 | | 3/2015 | |
| UA | 76547 | | 8/2006 | |
| WO | WO 02/103073 A2 | | 12/2002 | |
| WO | WO 2010085983 A1 | | 8/2010 | |
| WO | WO 2010086186 A1 | | 8/2010 | |
| WO | WO2012137687 | | 10/2012 | |
| WO | WO2013122004 A1 | | 8/2013 | |
| WO | WO2013156688 A1 | | 10/2013 | |
| WO | WO2014059475 A1 | | 4/2014 | |

OTHER PUBLICATIONS

U.S. Appl. No. 17/463,142, filed Aug. 31, 2021, Allely et al., enclosed.

U.S. Appl. No. 17/463,187, filed Aug. 31, 2021, Allely et al., enclosed.

U.S. Appl. No. 17/463,217, filed Aug. 31, 2021, Allely et al., enclosed.

Spiekermann P, "Legierungen—ein besonderes patentrechtliches Problem?", Mitteilungen Der Deutschen Patentanwaelte, Heymann, Koln, DE, (Jan. 1, 1993), vol. 34, ISSN 0026-6884, pp. 178-190, XP002152326 [A] 1-26 * p. 4-p. 5.

* cited by examiner

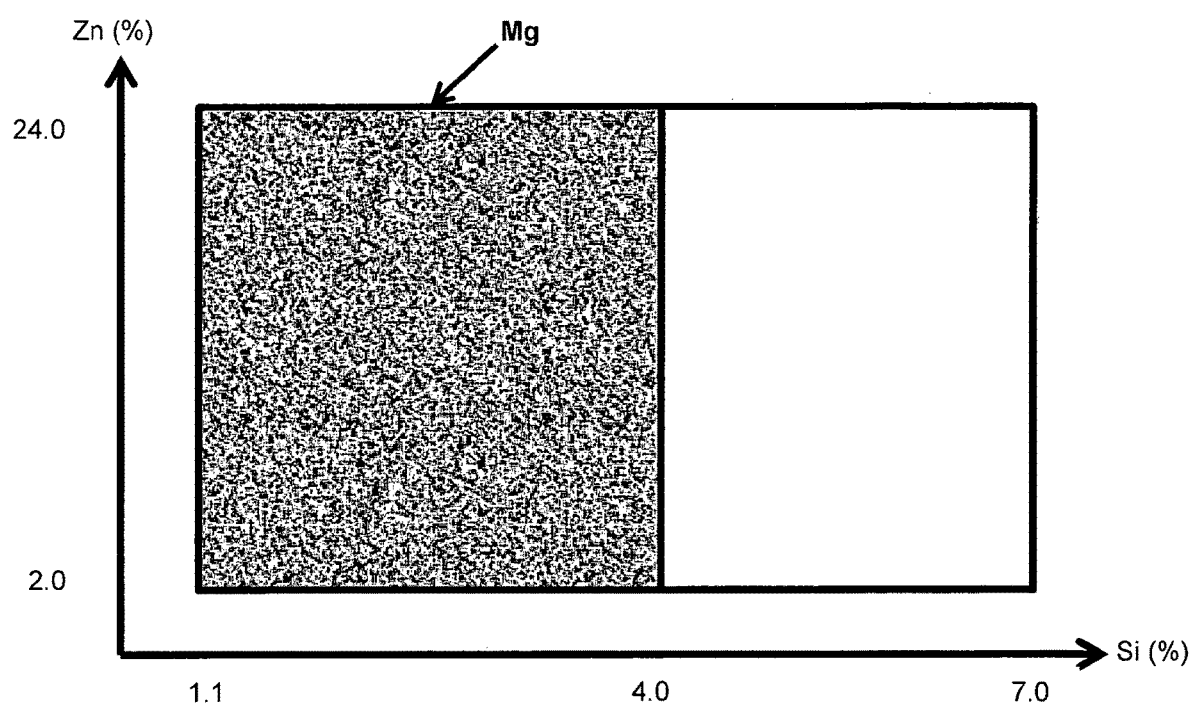

HOT FORMED PRE-COATED STEEL PART

This is a Continuation of U.S. Ser. No. 15/748,395, filed Jan. 29, 2018, which is a National Phase of International Patent Application PCT/IB2016/000983, filed Jul. 11, 2016 claiming priority to International Patent Application PCT/IB2015/001284, filed Jul. 30, 2015. All of the above applications are hereby incorporated by reference herein.

The present invention relates to a method for the manufacture of a hardened part starting from a steel sheet coated with a metallic coating. The invention is particularly well suited for the manufacture of automotive vehicles.

BACKGROUND

Zinc based coatings are generally used because they allow for a protection against corrosion thanks to barrier protection and cathodic protection. The barrier effect is obtained by the application of a metallic coating on steel surface. Thus, the metallic coating prevents the contact between steel and corrosive atmosphere. The barrier effect is independent from the nature of coating and substrate. On the contrary, sacrificial cathodic protection is based on the fact that zinc is a metal less noble that steel. Thus, if corrosion occurs, zinc is consumed preferentially to steel. Cathodic protection is essential in areas where steel is directly exposed to corrosive atmosphere, like cut edges where surrounding zinc will be consumed before steel.

However, when heating steps are performed on such zinc coated steel sheets, for example press hardening or welding, cracks are observed in steel which spread from the coating. Indeed, occasionally, there is a reduction of metal mechanical properties due to the presence of cracks in coated steel sheet after heating steps. These cracks appear with the following conditions: high temperature; contact with a liquid metal having a low melting point (such as zinc) in addition to stress; heterogeneous diffusion of molten metal with substrate grain bulk and boundary. The designation for such phenomenon is liquid metal embrittlement (LME), also called liquid metal assisted cracking (LMAC).

The patent application US2013/0206824 discloses a method for producing a steel component with a metallic anti-corrosion coating from a steel sheet comprising at least 0.4% by weight Mn. The sheet steel product is annealed in a continuous furnace under an annealing atmosphere containing up to 25% by volume $H_2$, 0.1% to 10% by volume $NH_3$, $H_2O$, $N_2$, and process-related impurities as the remainder, at a dew point between −50° C. and −5° C. at a temperature of 400 to 1100° C. for 5 to 600 s. The annealed steel sheet has a 5 to 200 μm thick nitration layer with a particle size finer than the particle size of the inner core layer. Once coated with a metallic protective layer, a blank is separated from the annealed steel sheet, heated to an austenitising temperature of 780 to 950° C., hot-formed, and cooled so that a hardened structure forms.

At high temperature, the nitration layer allows for a minimization of risk of embrittlement in a sheet steel produced even when the sheet steel product is provided with a metallic coating. The metallic coating, which can be applied to the steel substrate, is based on Zn, Al, Zn—Al, Zn—Mg, Zn—Ni, Zn—Fe, Al—Mg, Al—Si, Zn—Al—Mg or Zn—Al—Mg—Si.

However, from an industrial point of view, because of the presence of ammoniac gas during the nitriding treatment, lines have to be redesigned. Indeed, this step has to be done in a hermetic box to prevent the leakage of this gas. This hermetic box difficult to produce results in an increase of productivity costs. Moreover, it is difficult to find a material which can handle the corrosive ammoniac. Additionally, the nitriding treatment is added to the method for producing the coated part. Thus, the duration of this method is elongated resulting in a loss of productivity. Finally, the nitration layer inhibits the wettability of zinc coatings when hot-dip galvanization is realized.

SUMMARY OF THE INVENTION

An object of the invention is to provide a method for the manufacture of a hardened part which does not have LME issues. An advantage of the present invention is, in particular, an easy to implement method in order to obtain a part which does not have LME issues generated by the hot-forming.

The present invention provides a method for the manufacture of a hardened part comprising the following steps:

A) the provision of a steel sheet pre-coated with a metallic coating comprising from 2.0 to 24.0% by weight of zinc, from 1.1 to 7.0% by weight of silicon, optionally from 1.1 to 8.0% by weight of magnesium when the amount of silicon is between 1.1 and 4.0%, and optionally additional elements chosen from Pb, Ni, Zr, or Hf, the content by weight of each additional element being less than 0.3% by weight, the balance being aluminum and unavoidable impurities and residuals elements from feeding ingots or from the passage of the steel sheet in the molten bath, wherein the ratio Al/Zn is above 2.9, B) the cutting of the coated steel sheet to obtain a blank;

C) the thermal treatment of the blank at a temperature between 840 and 950° C. to obtain a fully austenitic microstructure in the steel, D) the transfer of the blank into a press tool, E) the hot-forming of the blank to obtain a part, F) the cooling of the part obtained at step E) in order to obtain a microstructure in steel being martensitic or martensito-bainitic or made of at least 75% of equiaxed ferrite, from 5 to 20% of martensite and bainite in amount less than or equal to 10%.

The present invention also provides a part formed from the method above. The part may advantageously include a microstructure of the metallic coating comprising an interdiffusion layer Fe+$Fe_3$Al, AlFe intermetallic phases containing dissolved Si and Zn and binary Zn—Al and Si-rich phases.

The present invention further provides use of the parts for the manufacture of an automotive vehicle.

BRIEF DESCRIPTION OF THE DRAWINGS

Other characteristics and advantages of the invention will become apparent from the following detailed description of the invention.

To illustrate the invention, various embodiments and trials of non-limiting examples will be described, particularly with reference to the following FIGURE:

FIG. 1 illustrates a schematic representation of the composition according to the invention comprising from 2.0 to 24.0% of zinc, from 1.1 to 7.0% by weight of silicon and optionally magnesium when the amount of silicon is between 1.1 and 4.0%.

DETAILED DESCRIPTION

The designation "steel" or "steel sheet" means a steel sheet for press hardening process having a composition allowing the part to achieve a higher tensile strength above or equal to 500 MPa, preferably above or equal to 1000 MPa, advantageously above or equal to 1500 MPa. The weight composition of steel sheet is preferably as follows: 0.03%≤C≤0.50%; 0.3%≤Mn≤3.0%; 0.05%≤Si≤0.8%; 0.015%≤Ti≤0.2%; 0.005%≤Al≤0.1%; 0%≤Cr≤2.50%; 0%≤S≤0.05%; 0%≤P≤0.1%; 0%≤B≤0.010%; 0%≤Ni≤2.5%; 0%≤Mo≤0.7%; 0%≤Nb≤0.15%; 0%≤N≤0.015%; 0%≤Cu≤0.15%; 0%≤Ca≤0.01%; 0%≤W≤0.35%, the balance being iron and unavoidable impurities from the manufacture of steel.

For example, the steel sheet is 22MnB5 with the following composition: 0.20%≤C≤0.25%; 0.15%≤Si≤0.35%; 1.10%≤Mn≤1.40%; 0%≤Cr≤0.30%; 0%≤Mo≤0.35%; 0%≤P≤0.025%; 0%≤S≤0.005%; 0.020%≤Ti≤0.060%; 0.020%≤Al≤0.060%; 0.002%≤B≤0.004%, the balance being iron and unavoidable impurities from the manufacture of steel.

The steel sheet can be Usibor®2000 with the following composition: 0.24%≤C≤0.38%; 0.40%≤Mn≤3%; 0.10%≤Si≤0.70%; 0.015%≤Al≤0.070%; 0%≤Cr≤2%; 0.25%≤Ni≤2%; 0.020%≤Ti≤0.10%; 0%≤Nb≤0.060%; 0.0005%≤B≤0.0040%; 0.003%≤N≤0.010%; 0.0001%≤S≤0.005%; 0.0001%≤P≤0.025%; it being understood that the contents of titanium and nitrogen satisfy Ti/N>3.42; and that the contents of carbon, manganese, chromium and silicon satisfy:

$$2.6C + \frac{Mn}{5.3} + \frac{Cr}{13} + \frac{Si}{15} \geq 1.1\%$$

the composition optionally comprising one or more of the following: 0.05% Mo 0.65%; 0.001%≤W≤0.30%; 0.0005%≤Ca≤0.005%, the balance being iron and unavoidable impurities from the manufacture of steel.

For example, the steel sheet is Ductibor®500 with the following composition: 0.040%≤C≤0.100%; 0.80%≤Mn≤2.00%; 0%≤Si≤0.30%; 0%≤S≤0.005%; 0%≤P≤0.030%; 0.010%≤Al≤0.070%; 0.015%≤Nb≤0.100%; 0.030%≤Ti≤0.080%; 0%≤N≤0.009%; 0%≤Cu≤0.100%; 0%≤Ni≤0.100%; 0%≤Cr≤0.100%; 0%≤Mo≤0.100%; 0%≤Ca≤0.006%, the balance being iron and unavoidable impurities from the manufacture of steel.

Steel sheet can be obtained by hot rolling and optionally cold rolling depending on the desired thickness, which can be for example between 0.7 and 3.0 mm.

The invention relates to a method for the manufacture of a hardened part which does not have LME issue. Firstly, this method comprises the provision of steel sheet pre-coated with a metallic coating comprising from 2.0 to 24.0% by weight of zinc, from 1.1 to 7.0% by weight of silicon, optionally from 1.1 to 8.0% by weight of magnesium when the amount of silicon is between 1.1 and 4.0%, and optionally additional elements chosen from Pb, Ni, Zr, or Hf, the content by weight of each additional element being less than 0.3% by weight, the balance being aluminum and unavoidable impurities and residuals elements, wherein the ratio Al/Zn is above 2.9.

The coating composition is illustrated FIG. 1. According to the invention, the coating comprises optionally from 1.1 to 8.0% by weight of magnesium when the amount of silicon is between 1.1 and 4.0%. The optional presence of magnesium is represented in grey in this FIGURE.

Without willing to be bound by any theory, it seems that if these conditions are not met, LME issue appears because Zn-rich phases are in too high amount and liquid zinc can diffuse towards the steel/coating interface and create macro-cracks in the steel.

Preferably, the metallic coating does not comprise elements selected among Cr, Mn, Ti, Ce, La, Nd, Pr, Ca, Bi, In, Sn and Sb or their combinations. In another preferred embodiment, the metallic coating does not comprise any of the following compounds: Cr, Mn, Ti, Ce, La, Nd, Pr, Ca, Bi, In, Sn and Sb. Indeed, without willing to be bound by any theory, it seems that when these compounds are present in the coating, there is a risk that the properties of the coating, such as electrochemical potential, are altered, because of their possible interactions with the essential elements of the coatings.

Preferably, the ratio Al/Zn is between 5 and 9. Without willing to be bound by any theory, it has been found that when the ratio Al/Zn is not between 5 and 9, there is a risk that the decrease of LME issue is less important because zinc is no longer in solid solution in the aluminum matrix and Zn-rich phases start to form.

Preferably, the ratio Zn/Si is between 2.9 and 8. Without willing to be bound by any theory, it has been found that when the ratio Zn/Si is not between 2.9 and 8, there is a risk that the decrease of LME issue is less important because the proportion of Zn-rich phases is a little too high in the coating Advantageously, the coating comprises from 2.0 to 5.0%, preferably 2.1 to 4.9% by weight of silicon. In another preferred embodiment, the coating comprises from 1.5 to 3.5% by weight of silicon. In another preferred embodiment, the coating comprises from 4.5 to 5.5% by weight of silicon.

Preferably, the coating comprises from 5.0 to 19.0%, preferably 5.0 to 15.0%, advantageously from 10.0 to 15.0% by weight of zinc.

Advantageously, when the amount of silicon is between 1.1 and 4.0% by weight, the coating can comprise from 0.5 to 3.0%, preferably from 1.0 to 2.9% by weight of magnesium. In another preferred embodiment, the coating comprises from 3.1 to 8.0%, preferably from 4.0 to 8% by weight of magnesium.

Advantageously, the coating comprises above 71%, preferably above 76%, by weight of aluminum.

The coating can be deposited by any methods known to the man skilled in the art, for example hot-dip galvanization process, electrogalvanization process, physical vapour deposition such as jet vapor deposition or sputtering magnetron. Preferably, the coating is deposited by hot-dip galvanization process. In this process, the steel sheet obtained by rolling is dipped in a molten metal bath.

The bath comprises zinc, silicon, aluminum and optionally magnesium. It can comprise additional elements chosen from Pb, Ni, Zr, or Hf, the content by weight of each additional element being less than 0.3% by weight. These additional elements can improve among others ductibility, coating adhesion on the steel sheet.

The bath can also contain unavoidable impurities and residuals elements from feeding ingots or from the passage of the steel sheet in the molten bath. Residual element can be iron with a content up to 3.0% by weight.

The thickness of the coating is usually between 5 and 50 µm, preferably between 10 and 35 µm, advantageously between 12 and 18 µm or between 26 to 31 µm. The bath temperature is usually between 580 and 660° C.

After the deposition of the coating, the steel sheet is usually wiped with nozzles ejecting gas on both sides of the coated steel sheet. The coated steel sheet is then cooled.

Preferably, the cooling rate is above or equal to 15° C. s$^{-1}$ between the beginning of the solidification and the end of the solidification. Advantageously, the cooling rate between the beginning and the end of the solidification is superior or equal to 20° C. s$^1$.

Then, a skin-pass can be realized and allows work hardening the coated steel sheet and giving it a roughness facilitating the subsequent shaping. A degreasing and a surface treatment can be applied in order to improve for example adhesive bonding or corrosion resistance.

Then, the coated steel sheet is cut to obtain a blank. A thermal treatment is applied to the blank in a furnace under non protective atmosphere at an austenitization temperature Tm usually between 840 and 950° C., preferably 880 to 930° C. Advantageously, said blank is maintained during a dwell time tm between 1 to 12 minutes, preferably between 3 to 9 minutes. During the thermal treatment before the hot-forming, the coating forms an alloy layer having a high resistance to corrosion, abrasion, wear and fatigue.

After the thermal treatment, the blank is then transferred to a hot-forming tool and hot-formed at a temperature between 600 and 830° C. The hot-forming comprises the hot-stamping and the roll-forming. Preferably, the blank is hot-stamped. The part is then cooled in the hot-forming tool or after the transfer to a specific cooling tool.

The cooling rate is controlled depending on the steel composition, in such a way that the final microstructure after the hot-forming comprises mostly martensite, preferably contains martensite, or martensite and bainite, or is made of at least 75% of equiaxed ferrite, from 5 to 20% of martensite and bainite in amount less than or equal to 10%.

Thus, a hardened part without LME according to the invention is obtained.

Preferably, the microstructure of the coating of the part comprises an interdiffusion layer Fe+Fe$_3$Al, AlFe intermetallic phases containing dissolved Si and Zn, binary Zn—Al and Si-rich phases. When magnesium is present in the coating, the microstructure comprises also Zn$_2$Mg phase and/or Mg$_2$Si phase.

In a preferred embodiment, the part is a press hardened steel part having a variable thickness, i.e. the press hardened steel part of the invention can have a thickness which is not uniform but which can vary. Indeed, it is possible to achieve the desired mechanical resistance level in the zones which are the most subjected to external stresses, and to save weight in the other zones of the press hardened part, thus contributing to the vehicle weight reduction. In particular, the parts with non-uniform thickness can be produced by continuous flexible rolling, i.e. by a process wherein the sheet thickness obtained after rolling is variable in the rolling direction, in relationship with the load which has been applied through the rollers to the sheet during the rolling process.

Thus, within the conditions of the invention, it is possible to manufacture advantageously vehicle parts with varying thickness in order to obtain for example a tailored rolled blank. Specifically, the part can be a front rail, a seat cross member, a side sill member, a dash panel cross member, a front floor reinforcement, a rear floor cross member, a rear rail, a B-pillar, a door ring or a shotgun.

For automotive application, after phosphating step, the part is dipped in an e-coating bath. Usually, the thickness of the phosphate layer is between 1 and 2 µm and the thickness of the e-coating layer is between 15 and 25 µm, preferably inferior or equal to 20 µm. The cataphoresis layer ensures an additional protection against corrosion.

After the e-coating step, other paint layers can be deposited, for example, a primer coat of paint, a basecoat layer and a top coat layer.

Before applying the e-coating on the part, the part is previously degreased and phosphated so as to ensure the adhesion of the cataphoresis.

The invention will now be explained in trials carried out for information only. They are not limiting.

EXAMPLES

For all samples, steel sheets used are 22MnB5. The composition of the steel is as follows: C=0.2252%; Mn=1.1735%; P=0.0126%, S=0.0009%; N=0.0037%; Si=0.2534%; Cu=0.0187%; Ni=0.0197%; Cr=0.180%; Sn=0.004%; Al=0.0371%; Nb=0.008%; Ti=0.0382%; B=0.0028%; Mo=0.0017%; As=0.0023% et V=0.0284%.

All coatings were deposited by hot-dip galvanization process.

Example 1: Cracking Resistance Test

This test is used to determine the presence of cracks obtainable after the hot-forming during the press hardening process.

Trials 1 to 10 were prepared and subjected to the Cracking resistance test.

To this end, coated trials were cut in order to obtain a blank. Blanks were then heated at a temperature of 900° C. during a dwell time varying between 5 and 10 minutes. Blanks were transferred into a press tool and hot-stamped in order to obtain parts having an omega shape. Then, parts were cooled to obtain a hardening by martensitic transformation.

Finally, the deformed section of parts was cut. Then, the presence of cracks was analyzed by SEM (Scanning Electron Microscopy). 0 means excellent, in other words, there is no cracks at all; 1 means that there are microcracks having a deep between 0 and 50 µm and 2 means very bad, in other words, there are macrocracks having a deep above 50 µm. Results are shown in the following Table 1:

| | Coating | | | | | | Thickness | thermal treatment at 900° C. | |
| --- | --- | --- | --- | --- | --- | --- | --- | --- | --- |
| | | | | | | | | Dwell time = 5 | Dwell time = 10 |
| Trials | Al | Si | Zn | Mg | Al/Zn | Zn/Si | (µm) | minutes | minutes |
| 1 | 81 | 9 | 10 | — | 8.1 | 1.1 | 27 | 2 | 2 |
| 2 | 77 | 9 | 10 | 4 | 7.7 | 1.1 | 27 | 2 | 1 |
| 3 | 73 | 9 | 10 | 8 | 7.3 | 1.1 | 27 | 2 | 2 |
| 4 | 76 | 9 | 15 | — | 5.1 | 1.7 | 27 | 2 | 2 |
| 5 | 79 | 5 | 15 | 1 | 5.3 | 3.0 | 27 | 2 | 2 |
| 6 | 78 | 5 | 15 | 2 | 5.2 | 3.0 | 27 | 2 | 2 |
| 7* | 80 | 5 | 15 | — | 5.3 | 3.0 | 27 | 0 | 0 |
| 8* | 83 | 2 | 15 | — | 5.6 | 7.5 | 27 | 0 | 0 |
| 9* | 86 | 2 | 10 | 2 | 8.6 | 5.0 | 27 | 0 | 0 |
| 10* | 88 | 2 | 10 | — | 8.8 | 5.0 | 27 | 0 | 0 |

*examples according to the invention.

All Trials according to the invention (Trials 7 to 10) show excellent behavior during hot-stamping. Indeed, no crack appears with the parts according to the present invention in contrary to Trials 1 to 6.

Example 2: Tool Degradation Test

This test is used to determine the presence of scratch and coating smearing in the press tool after the hot-stamping.

Thus, the press tool was analyzed by naked eyes after the hot-stamping of Trials 1, 2, 4 and 7 to 10 prepared in Example 1. 0 means excellent, in other words, there is no tool degradation and no coating smearing in the press tool; 1 means that there are scratches and slight coating smearing in the press tool and 2 means very bad, in other words, there are heavy scratches and important coating smearing in the press tool. Results are shown in the following Table 2:

| Trials | Coating | | | | | | Covering rate after a thermal treatment at 900° C. (%) | |
|---|---|---|---|---|---|---|---|---|
| | Al | Si | Zn | Mg | Al/Zn | Zn/Si | Dwell time = 5 minutes | Dwell time = 10 minutes |
| 11 | 81 | 9 | 10 | — | 9.1 | 1.1 | 1 | 1 |
| 12 | 77 | 9 | 10 | 4 | 7.7 | 1.1 | 2 | 2 |
| 13 | 76 | 9 | 15 | — | 5.1 | 1.7 | 2 | 1 |
| 14* | 80 | 5 | 15 | — | 5.3 | 3.0 | 0 | 0 |
| 15* | 83 | 2 | 15 | — | 5.5 | 7.5 | 0 | 0 |
| 16* | 86 | 2 | 10 | 2 | 8.6 | 5.0 | 0 | 0 |
| 17* | 88 | 2 | 10 | — | 8.6 | 5.0 | 0 | 0 |

*examples according to the invention.

Trials 14 to 17 according to the invention have an excellent behavior in a press tool in contrary to Trials 11 to 13.

What is claimed is:

1. A hot formed pre-coated steel part, comprising a steel sheet precoated with a metallic coating and then hot formed into the hot formed pre-coated steel part, the coating including:
    2.0 to 24.0% by weight of zinc;
    1.1 to 7.0% by weight of silicon;
    and optionally additional elements chosen from Pb, Ni, Zr or Hf, a content by weight of each additional element being less than 0.3% by weight,
    a balance being aluminum, unavoidable impurities and residual elements resulting from feeding ingots or from a passage of the steel sheet in a molten bath;
    a ratio Al/Zn by weight greater than 2.9; and
    a ratio Zn/Si by weight between 2.9 and 8;
    a microstructure in the steel sheet after hot forming being martensitic or martensitic-bainitic or made of at least 75% of equiaxed ferrite, 5 to 20% of martensite and bainite in an amount less than or equal to 10%,
    wherein a thickness of the coating is between 10 and 50 µm, and the coating is free from magnesium.

2. The hot formed pre-coated steel part according to claim 1, wherein the coating comprises at least one of the additional elements chosen from Pb, Ni, Zr, or Hf.

3. The hot formed pre-coated steel part according to claim 1, wherein the ratio Al/Zn is between 5 and 9.

4. The hot formed pre-coated steel part according to claim 1, wherein the coating comprises from 2.0 to 4.0% by weight of silicon.

5. The hot formed pre-coated steel part according to claim 4, wherein the coating comprises from 2.0 to 3.5% by weight of silicon.

6. The hot formed pre-coated steel part according to claim 4, wherein the coating comprises from 5.0 to 10.0% by weight of zinc.

7. The hot formed pre-coated steel part according to claim 1, wherein the coating comprises from 2.1 to 4.9% by weight of silicon.

8. The hot formed pre-coated steel part according to claim 1, wherein the coating comprises from 1.5 to 3.5% by weight of silicon.

9. The hot formed pre-coated steel part according to claim 8, wherein the coating comprises from 5.0 to 10.0% by weight of zinc.

10. The hot formed pre-coated steel part according to claim 1, wherein the coating comprises from 5.0 to 19.0% by weight of zinc.

11. The hot formed pre-coated steel part according to claim 1, wherein the coating comprises from 5.0 to 15.0% by weight of zinc.

12. The hot formed pre-coated steel part according to claim 1, wherein the coating comprises from 5.0 to 10.0% by weight of zinc.

13. The hot formed pre-coated steel part according to claim 1, wherein the coating comprises greater than 71% by weight of aluminum.

14. The hot formed pre-coated steel part according to claim 1, wherein the coating comprises greater than 76% by weight of aluminum.

15. The hot formed pre-coated steel part according to claim 1, wherein a thickness of the coating is between 12 and 50 µm.

16. The hot formed pre-coated steel part according to claim 15, wherein the thickness is between 10 and 35 µm.

17. The hot formed pre-coated steel part according to claim 15, wherein the thickness is between 12 and 18 µm.

18. The hot formed pre-coated steel part according to claim 15, wherein the thickness is between: 26 and 31 µm.

19. The hot formed pre-coated steel part according to claim 1, wherein the coating does not comprise any of Cr, Mn, Ti, Ce, La, Nd, Pr, Bi, In, Sn and Sb.

20. The hot formed pre-coated steel part according to claim 1, wherein the coating does not include In and the coating does not include Sn.

21. The hot formed pre-coated steel part according to claim 1, wherein the microstructure of the metallic coating comprises an interdiffusion layer $Fe+Fe_3Al$, AlFe intermetallic phases containing dissolved Si and Zn, binary Zn-Al and Si-rich phases.

22. The hot formed pre-coated steel part according to claim 21, wherein the microstructure of the metallic coating comprises at least one of a $Zn_2Mg$ phase or a $Mg_2Si$ phase.

23. The hot formed pre-coated steel part according to claim 1, wherein the part is a press hardened steel part having a variable thickness.

24. The hot formed pre-coated steel part according to claim 23, wherein the variable thickness is produced by a continuous flexible rolling process.

25. The hot formed pre-coated steel part according to claim 1, wherein the part is a tailored rolled blank.

26. The hot formed pre-coated steel part according to claim 1 wherein the part is a front rail, a seat cross member, a side sill member, a dash panel cross member, a front floor reinforcement, a rear floor cross member, a rear rail, a B-pillar, a door ring or a shotgun.

27. The hot formed pre-coated steel part according to claim 1 wherein the steel sheet has a base made of 22MnB5 steel.

28. The hot formed pre-coated steel part according to claim 1 wherein the steel sheet has a base with a composition by weight percentage including: 24%≤C≤0.38%; 0.40%≤Mn≤3%; 0.10%≤Si≤0.70%; 0.015%≤Al≤0.070%; 0%≤Cr≤2%; 0.25%≤Ni≤2%; 0.020%≤Ti≤0.10%; 0%≤Nb≤0.060%; 0.0005%≤B≤0.0040%; 0.003%≤N ≤0.010%; 0.0001%≤S≤0.005%; 0.0001%≤P≤0.025%; it being understood that the contents of titanium and nitrogen satisfy Ti/N>3.42, and that the contents of carbon, manganese, chromium and silicon satisfy 2.6C+Mn/5.3+Cr/13+Si/15>1.1%, the composition optionally comprising one or more of the following: 0.05%≤Mo≤0.65%; 0.001%≤W≤0.30%; 0.0005%≤Ca≤0.005%, a balance of the steel sheet base composition being iron and unavoidable impurities from manufacture.

29. The hot formed pre-coated steel part according to claim 1, wherein the steel sheet has a base with a composition by weight percentage including: 0.040%≤C≤0.100%; 0.80%≤Mn≤2.00%; 0%≤Si≤0.30%; 0%≤S≤0.005%; 0%≤P≤0.030%; 0.010%≤Al≤0.070%; 0.015%≤Nb ≤0.100%; 0.030%≤Ti≤0.080%; 0%≤N≤0.009%; 0%≤Cu≤0.100%; 0%≤Ni≤0.100%; 0%≤Cr≤0.100%; 0%≤Mo≤0.100%; 0%≤Ca≤0.006%, a balance of the steel sheet base composition being iron and unavoidable impurities from manufacture.

30. The hot formed pre-coated steel part according to claim 1, wherein the steel sheet has a base with a composition by weight percentage including: 0.03%≤C≤0.50%; 0.3%≤Mn≤3.0%; 0.05%≤Si≤0.8%; 0.015%≤Ti≤0.2%; 0.005%≤Al≤0.1%; 0%≤Cr≤2.50%; 0%≤S≤0.05%; 0%≤P≤0.1%; 0%≤B≤0.010%; 0%≤Ni≤2.5%; 0%≤Mo≤ 0.7%; 0%≤Nb≤0.15%; 0%≤N≤0.015%; 0%≤Cu≤0.15%; 0%≤Ca≤0.01%; 0%≤W≤0.35%, a balance of the steel sheet base composition being iron and unavoidable impurities from the manufacture of steel.

31. The hot formed pre-coated steel part according to claim 1, wherein the coating after hot forming and subsequent cooling has no cracks.

32. An automotive vehicle comprising the part according to claim 1.

33. The hot formed pre-coated steel part according to claim 1, wherein the coating does not include Ca.

34. The hot formed pre-coated steel part according to claim 1, wherein the ratio Al/Zn is 5.6 or less.

35. The hot formed pre-coated steel part according to claim 1, wherein the coating includes 10 to 15% zinc, 2 to 5% silicon, a ratio Al/Zn between 5.3 and 8.8%; and a ratio Zn/Si by weight between 3 and 7.5.

36. The hot formed pre-coated steel part according to claim 1, wherein the coating includes, by weight, 10%<zinc≤24%.

37. The hot formed pre-coated steel part according to claim 1, wherein the coating includes 1.1 to 4.9% by weight of silicon.

38. The hot formed pre-coated steel part according to claim 1, wherein the coating includes 1.1 to 2% by weight of silicon, or 15 to 24.0% by weight of zinc.

39. A hot formed pre-coated steel part, comprising a steel sheet precoated with a metallic coating and then hot formed into the hot formed pre-coated steel part, the coating including:
  2.0 to 24.0% by weight of zinc;
  1.1 to 7.0% by weight of silicon;
  0 to 3.0% by weight of magnesium, with the proviso that the coating includes from 0.5 to 3.0% by weight of magnesium when the amount of silicon is between 1.1 and 4.0%,
  and at least one additional elements chosen from Pb, Ni, Zr or Hf, a content by weight of each additional element being less than 0.3% by weight,
  a balance being aluminum, unavoidable impurities and residual elements resulting from feeding ingots or from a passage of the steel sheet in a molten bath; and
  a ratio Al/Zn by weight between 8.6 and 9; and
  a ratio Zn/Si by weight between 2.9 and 8, wherein the microstructure in the steel sheet after hot forming is made of at least 75% of equiaxed ferrite, 5 to 20% of martensite and bainite in an amount less than or equal to 10%, and a thickness of the coating is between 10 and 50 μm.

40. The hot formed pre-coated steel part according to claim 39, wherein the coating comprises from 0.5 to 3.0% by weight of magnesium.

41. The hot formed pre-coated steel part according to claim 40, wherein the coating comprises from 5.0 to 10.0% by weight of zinc.

42. The hot formed pre-coated steel part according to claim 41, wherein the coating comprises greater than 71% by weight of aluminum.

43. The hot formed pre-coated steel part according to claim 41, wherein the coating comprises greater than 76% by weight of aluminum.

44. The hot formed pre-coated steel part according to claim 39, wherein the coating comprises from 1.0 to 2.9% by weight of magnesium.

45. The hot formed pre-coated steel part according to claim 39, wherein the coating comprises from 1.5 to 3.5% by weight of silicon, from 5.0 to 10.0% by weight of zinc, and 1.0 to 2.9% by weight of magnesium.

46. The hot formed pre-coated steel part according to claim 45, wherein the coating comprises greater than 71% by weight of aluminum.

47. The hot formed pre-coated steel part according to claim 45, wherein the coating comprises greater than 76% by weight of aluminum.

48. A hot formed pre-coated steel part, comprising a steel sheet precoated with a metallic coating and then hot formed into the hot formed pre-coated steel part, the coating including:
  2.0 to 24.0% by weight of zinc;
  1.1 to 7.0% by weight of silicon;
  and optionally additional elements chosen from Pb, Ni, Zr or Hf, a content by weight of each additional element being less than 0.3% by weight,
  a balance being aluminum, unavoidable impurities and residual elements resulting from feeding ingots or from a passage of the steel sheet in a molten bath;
  a ratio Al/Zn by weight greater than 2.9;
  a ratio Zn/Si by weight between 2.9 and 8;
  a microstructure in the steel sheet after hot forming being made of at least 75% of equiaxed ferrite, 5 to 20% of martensite and bainite in an amount less than or equal to 10%,
  wherein a thickness of the coating is between 10 and 50 μm, and the coating is free from magnesium.

49. The hot formed pre-coated steel part according to claim 48, wherein the coating includes 1.1 to 2% by weight of silicon, or 15 to 24.0% by weight of zinc.

50. A hot formed pre-coated steel part, comprising
  a steel sheet precoated with a metallic coating and then hot formed into the hot formed pre-coated steel part, the coating including:
  2.0 to 24.0% by weight of zinc;
  1.1 to 7.0% by weight of silicon;
  and optionally additional elements chosen from Pb, Ni, Zr or Hf, a content by weight of each additional element being less than 0.3% by weight,
  a balance being aluminum, unavoidable impurities and residual elements resulting from feeding ingots or from a passage of the steel sheet in a molten bath; and
  a ratio Al/Zn by weight greater than 2.9;

a microstructure in the steel sheet after hot forming being martensitic or martensitic-bainitic or made of at least 75% of equiaxed ferrite, 5 to 20% of martensite and bainite in an amount less than or equal to 10%, wherein the steel sheet has a base with a carbon content by weight of between 0.24% and 0.38%, wherein a thickness of the coating is between 10 and 50 µm, and the coating is free from magnesium.

51. The hot formed pre-coated steel part according to claim 50, wherein the coating includes 1.1 to 2% by weight of silicon, or 15 to 24.0% by weight of zinc.

52. A hot formed pre-coated steel part, comprising
a steel sheet precoated with a metallic coating and then hot formed into the hot formed pre-coated steel part, the coating including:
2.0 to 24.0% by weight of zinc;
1.1 to 7.0% by weight of silicon;
at least one additional elements chosen from Pb, Ni, Zr or Hf, a content by weight of each additional element being less than 0.3% by weight,
a balance being aluminum, unavoidable impurities and residual elements resulting from feeding ingots or from a passage of the steel sheet in a molten bath; and
a ratio Zn/Si by weight is between 7.5 and 8;
a microstructure in the steel sheet after hot forming being made of at least 75% of equiaxed ferrite, 5 to 20% of martensite and bainite in an amount less than or equal to 10%, wherein the steel sheet has a base with a carbon content by weight of between 0.24% and 0.38%, wherein a thickness of the coating is between 10 and 50 µm, and the coating includes 0.5≤Mg≤3.0%.

53. The hot formed pre-coated steel part according to claim 52, wherein the coating includes 1.1 to 2% by weight of silicon, or 15 to 24.0% by weight of zinc.

54. A hot formed pre-coated steel part, comprising a steel sheet precoated with a metallic coating and then hot formed into the hot formed pre-coated steel part, the coating including:
2.0 to 24.0% by weight of zinc;
1.1 to 7.0% by weight of silicon;
and optionally additional elements chosen from Pb, Ni, Zr or Hf, a content by weight of each additional element being less than 0.3% by weight,
a balance being aluminum, unavoidable impurities and residual elements resulting from feeding ingots or from a passage of the steel sheet in a molten bath;
a ratio Al/Zn by weight greater than 2.9; and
a ratio Zn/Si by weight between 2.9 and 8;
a microstructure in the steel sheet after hot forming being martensitic or martensitic-bainitic or made of at least 75% of equiaxed ferrite, 5 to 20% of martensite and bainite in an amount less than or equal to 10%; and
wherein the hot formed pre-coated steel part exhibits no microcracks having a depth greater than 50 µm; and
wherein a thickness of the coating is between 10 and 50 µm, and the coating is free from magnesium.

55. The hot formed pre-coated steel part according to claim 54, wherein the coating includes 10 to 15% zinc, 2 to 5% silicon, a ratio Al/Zn between 5.3 and 8.8%; and a ratio Zn/Si by weight between 3 and 7.5.

56. A hot formed pre-coated steel part, comprising a steel sheet precoated with a metallic coating and then hot formed into the hot formed pre-coated steel part, the coating including:
5 to 10% by weight of zinc;
2 to 5% by weight of silicon;
at least on additional elements chosen from Pb, Ni, Zr or Hf, a content by weight of each additional element being less than 0.3% by weight,
a balance being aluminum, unavoidable impurities and residual elements resulting from feeding ingots or from a passage of the steel sheet in a molten bath;
a ratio Al/Zn by weight between 5.3 and 8.8%; and
a ratio Zn/Si by weight between 3 and 7.5;
a microstructure in the steel sheet after hot forming being at least 75% of equiaxed ferrite, 5 to 20% of martensite and bainite in an amount less than or equal to 10%; and
wherein the hot formed pre-coated steel part exhibits no microcracks having a depth greater than 50 µm, wherein a thickness of the coating is between 10 and 50 µm, and the coating includes more than 0 and less that 3.0% by weight of magnesium, with the proviso that the coating includes from 0.5 to 3.0% by weight of magnesium when the amount of silicon is between 1.1 and 4.0%.

57. The hot formed pre-coated steel part according to claim 56, wherein the coating includes 1.1 to 4.9% by weight of silicon.

* * * * *